United States Patent [19]

Miller

[11] Patent Number: 4,710,927

[45] Date of Patent: Dec. 1, 1987

[54] DIAGNOSTIC CIRCUIT

[75] Inventor: Michael J. Miller, San Jose, Calif.

[73] Assignee: Integrated Device Technology, Inc., Santa Clara, Calif.

[21] Appl. No.: 888,701

[22] Filed: Jul. 24, 1986

[51] Int. Cl.⁴ .............................. G01R 31/28
[52] U.S. Cl. ..................... 371/15; 324/73 R
[58] Field of Search ............. 371/15, 25; 324/73 R, 324/73 AT, 73 PC

[56] References Cited

U.S. PATENT DOCUMENTS

| | | | |
|---|---|---|---|
| 4,366,393 | 12/1982 | Kasuya | 371/15 X |
| 4,476,560 | 10/1984 | Miller | 371/15 |
| 4,597,042 | 6/1986 | d'Angeac et al. | 364/200 |
| 4,649,539 | 3/1987 | Crain et al. | 371/25 |
| 4,667,325 | 5/1987 | Kitano et al. | 371/25 |
| 4,670,877 | 6/1987 | Nishibe | 371/15 |
| 4,680,733 | 7/1987 | Duforestel et al. | 364/900 |

Primary Examiner—Charles E. Atkinson
Attorney, Agent, or Firm—Thomas E. Schatzel

[57] ABSTRACT

A diagnostic circuit is disclosed which employs a command register for receiving in serial format the command portion of a serial diagnostic signal and for developing in parallel format signals representing the command most recently received, a data register for receiving in serial format the data portion of the serial diagnostic signal, for receiving in parallel format signals representing data, for developing in parallel format signals representing the data most recently received and a multiplexer for combining the command portion and the data portion of the serial diagnostic signal after they have passed through the command and data registers.

8 Claims, 1 Drawing Figure

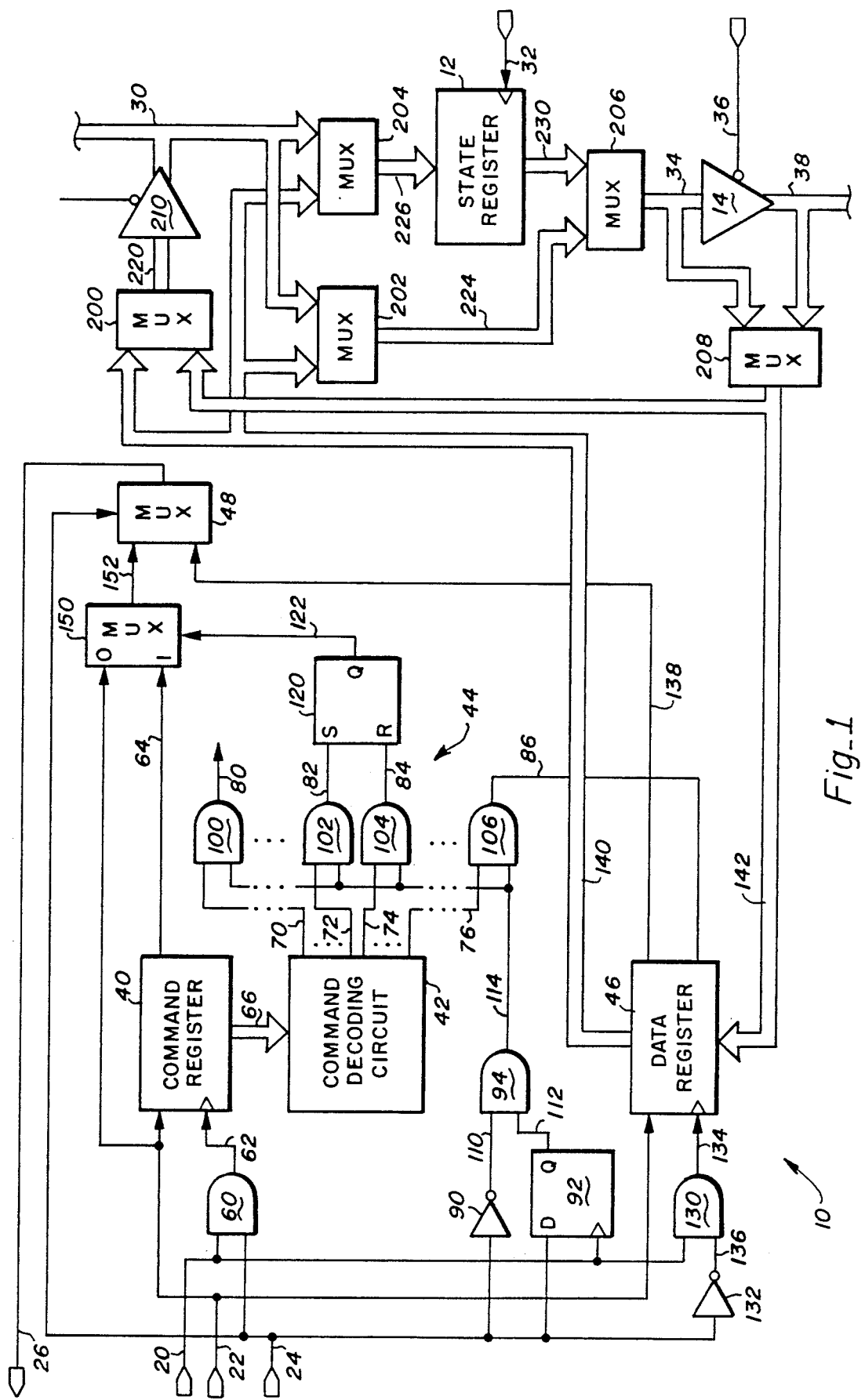
Fig_1

DIAGNOSTIC CIRCUIT

BACKGROUND OF THE INVENTION

1. Field of the Invention

The present invention relates to integrated circuit devices generally and more particularly to built in test facilities with serial diagnostics.

2. Description of the Prior Art

As the integration level of integrated circuit (IC) devices has increased so has the board and system level. This trend has increased the difficulty of insuring correct designs and facilitating production/field testing. The desirable higher packing density achieved with surface mounting (LCC) and tighter pin spacing have also contributed to more difficult testing conditions. To relieve the situation, manufactures of systems, boards, and integrated circuit devices have started to implement built in test facilities (BIT) in their respective products. (For a more detailed review of prior art type serial diagnostics, the reader is directed to one or more of the following references: the U.S. Pat. No. 4,476,560 which issued to W. Miller et al; the publication that is designated "Application Note AN-127" by Monolithic Memories Incorporated; The paper which is entitled "Diagnostic Devices and Algorithms for Testing Digital Systems" by Imtiyaz M. Bengali, Vincent J. Coli, and Frank Lee and which appeared in the Electro '84 Program Session Record Session 16, May 15–17, 1984; and the publication that is designated "On-Chip Diagnostics Handbook" by Advanced Micro Devices Incorporated.)

Briefly, the references indicate that the techniques employed for testing combinatorial (logic) circuits are often inefficient and ineffective for testing sequential (logic) circuits. (The state (logic levels) of the signals developed at the outputs of a combinatorial circuit depend only on the present state of the signals developed at the circuit inputs. On the other hand, in a sequential circuit, the state of the signals developed at the circuit outputs also depend on the previous state(s) of the input signals.)

Ideally, it was suggested that if the values in all of the registers of a sequential circuit could be controlled and observed with a straightforward operation, the diagnostic tasks could be reduced to those for a combinatorial circuit. For this purpose, it was suggested that the feedback paths be broken and the test data inserted in place of the sequential data in the registers. Direct parallel loading of data into and out of the registers was ruled out because of the very wide input and output buses required. Also, direct serial loading was ruled out, because some data bit pattern may be forbidden, particularly in registers in a control path. It was indicated that the forbidden conditions might be violated as data is shifted into or out of the register.

For diagnostic purposes, it was suggested that an additional, diagnostic circuit be employed for each of the registers into which test data is to be inserted. The suggested diagnostic circuit employs a "diagnostic" register and a multiplexer. (The diagnostic register was also referred to in the references as a shadow register. The existing register, which was also referred to in the references as, a feedback register, an output register, and a pipeline register, is referred to hereafter as a "state" register.)

The diagnostic register, which is of the same length (has the same number of stages) as the state register, includes a mode (load) input, a clock input, a serial data input for use with the clock input for shifting test data (in serial format) into the register, and a serial data output for use with the clock input for shifting test data (in serial format) out of the register. Further, the diagnostic register includes a set of parallel data inputs for use with the mode input for loading test data (in parallel format) into the register and a set of parallel data outputs. The multiplexer which is also of the same length as the state register, includes a mode (select) input, a first set of parallel data inputs, a second set of parallel data inputs, and a set of parallel data outputs. The multiplexer is of the type which develops at the set of data outputs, signals the logical state of which correspond to the state each of a respective signal developed either at the first or at the second set of data inputs as selected by the logical state of a signal developed at the mode input.

The additional diagnostic circuit is configured with the mode input of the diagnostic register connected to the mode input of the multiplexer. Additionally, the parallel data inputs of the diagnostic register are connected each to a respective one of the (parallel) data outputs of the state register; and, the parallel data outputs of the diagnostic register are connected each to a respective one of the first set of data inputs of the multiplexer. The normal connections to the (parallel) data inputs of the state register are broken. The second set of data inputs of the multiplexer are connected to the respective lines (of the combinatorial network) previously connected to the data inputs of the state register, which are now connected to the respective data outputs of the multiplexer.

Finally, it is indicated that the above diagnostic circuit should be connected in cascade with other diagnostic circuits. The serial data output of one diagnostic register is connected to the serial data input of the next diagnostic register. No doubt, all of the diagnostic register clock inputs are interconnected, as are all of the mode inputs.

Although effective in transferring test data into registers of a sequential circuit, the above mentioned, prior art type diagnostic circuit is disadvantageous in that it lacks means for employing test addresses and test commands.

SUMMARY OF THE PRESENT INVENTION

It is therefore the primary object of the present invention to provide a diagnostic circuit which can employ test addresses and test commands as well as test data.

Another object of the present invention is to provide a diagnostic circuit which is suitable for inclusion in an integrated circuit device with a minimum number of additional pins.

Briefly, the presently preferred embodiment of the present invention employs a command register, a data register, and a multiplexer. The command register includes a clock input; a serial data input, for use with the clock input for shifting test commands (in serial format) into the register; a serial data output for use with the clock input for shifting test commands (in serial format) out of the register; and a set of parallel data outputs at which the command register develops a number of signals representing the most recently received command. The data register includes a clock input, a serial data input for use with the clock input for shifting test data (in serial format) into the register, a serial data output for use with the clock input for shifting test data (in serial format) out of the register, a load input, a number of parallel data inputs for use with the load input for loading test data (in parallel format) into the register and a number of parallel data outputs at which the data register develops a number of signals representing the most recently received data. The multiplexer includes a data input connected to the serial data output of the command register, another data input connected to the serial data output of the data register a control input and a data output.

The ability to provide a diagnostic circuit which can employ test addresses and test commands as well as test data is the principal advantage of the present invention.

Another advantage of the present invention is the ability it affords to provide a diagnostic circuit which is suitable for inclusion in an integrated circuit device with a minimum number of additional pins.

These and other objects and advantages of the present invention will no doubt be obvious to those skilled in the art after having read the following detailed description of the presently preferred embodiment which is illustrated in the figure of the drawing.

IN THE DRAWING

FIG. 1 is a schematic diagram of the presently preferred embodiment in accordance with the present invention of a diagnostic circuit.

DETAILED DESCRIPTION OF THE PREFERRED EMBODIMENT

In accordance with the present invention, illustrated in FIG. 1 of the drawing generally designated by the number 10 is the presently preferred embodiment of a diagnostic circuit for use in testing another circuit that is represented by a state register, which is designated 12, and eight tri-state buffers, that are represented by a buffer, which is designated 14. For diagnostic purposes, (in a diagnostic mode) diagnostic circuit 10 receives three (externally) developed signals and develops (outputs) one (internally) developed signal. More specifically, diagnostic circuit 10 receives a serial diagnostic signal clocking signal, which is (externally) developed on a line which is designated 20; a serial diagnostic signal, which includes (in serial format) both commands and data and which is (externally) developed on a line 22; and a command/data control signal which is (externally) developed on a line 24, and develops (outputs) a (the) serial diagnostic signal, which includes (in serial format) both commands and data and which is (internally) developed on a line 26.

In a normal (non-diagnostic) mode, state register 12 receives (in parallel format) eight signals (externally) developed on an eight line (D) bus, which is designated 30, receives on a line 32 an (externally) developed signal for clocking (loading) the (D) bus 30 signals into the register, and develops eight signals on an eight line (internal) (Q) bus 34. In the normal mode, the eight buffers represented by buffer 14 receive an (active low) output enabling signal (externally) developed on a line 36 and (when the level of the output enabling signal is low) (internally) develop on an eight line (Y) bus, which is designated 38, eight (output) signals the states of which correspond each to a respective one of the eight signals developed on bus 34.

Diagnostic circuit 10 is shown to employ as principal components a command register, which is designated 40, a command decoding circuit, which is designated 42, a command strobe generating circuit, which is generally designated 44, a data register, which is designated 46, and a multiplexer, which is designated 48.

Command register 40 includes a clock input; a serial data input, for use with the clock input for shifting test commands (in serial format) into the register; a serial data output for use with the clock input for shifting test commands (in serial format) out of the register; and a number of parallel data outputs. In the presently preferred embodiment, command register 40 includes four stages (and, thus, four parallel data outputs).

The clock input of command register 40 is coupled to line 20 by a 2-input AND gate 60 to receive the (externally) developed diagnostic circuit 10 driving, serial diagnostic signal clocking signal only when a diagnostic circuit 10 driving, command/data control signal having a high-logic level is (externally) developed on line 24. More particularly, the clock input of command register 40 is coupled by a line 62 to the output of gate 60, the inputs of which are connected, one to line 20 and the other to line 24. Further, the serial data input of command register 40 is directly connected to line 22, to receive the (command portion of the) (externally) developed diagnostic circuit 10 driving, serial diagnostic signal. The serial data output of command register 40 is connected to a line 64; and, the four register parallel data outputs are connected each to a corresponding line of a four line bus 66.

The implementation of command decoding circuit 42 follows from the control requirements of the circuit being tested. For some simple applications, one, or more, of the lines of bus 66 (the outputs of command register 40) are directly connected to the components to be controlled. (Of course, such an implementation is unsuited for controlling registers in a control path, particularly where some command bit pattern may be forbidden and where the forbidden conditions might be violated as commands are shifted into or out of command register 40. Also, such an implementation may require excessively long diagnostic commands.)

In the presently preferred embodiment, command decoding circuit 42 includes a four-line-to-sixteen line decoder having four data input lines each connected to a corresponding line of the four lines of bus 66, and sixteen data output lines. Before being coupled to a number of lines represented by four lines, respectively designated 70, 72, 74, and 76, some of the signals developed on the decoder data output lines are combined by a number of gates to develop a number of command signals. A detailed description of the configuration of the gates of command decoding circuit 42 is presented in conjunction with the description of the operation of diagnostic circuit 10.

Command strobe generating circuit 44 is configured to couple the command signals developed by command decoding circuit 42 on the lines represented by lines 70, 72, 74, and 76 each to a corresponding line of a number of lines represented by four lines respectively designated 80, 82, 84, and 86 only during periods between the high-level-to-low-level transition of a diagnostic circuit 10 driving, command/data control signal (externally) developed on line 24 and the low-level-to-high-level transition of the next cycle of a diagnostic circuit 10 driving, serial diagnostic signal clocking signal (externally) developed on line 20.

For this purpose, command strobe generating circuit 44 includes an inverter 90, a D-type flip flop 92, a 2-input AND gate 94, and a number of additional 2-input AND gates, represented by four gate, respectively designated 100, 102, 104, and 106. One input of gate 94 is coupled by a line 110 and inverter 90 to line 24 to receive the (externally developed) diagnostic circuit 10 driving, command/data control signal. The other input of gate 94 is coupled by a line 112 to the (active high) data output (Q) of flip flop 92 the data input (D) of which is also connected to line 24 and the clock input of which is connected to line 20 to receive the (externally developed) diagnostic circuit 10 driving, serial diagnostic signal clocking signal. The output of gate 94 is coupled by a line 114 to one input of each of the additional gates represented by gates 100, 102, 104, and 106. The other input of each of the gates represented by gates 100, 102, 104, and 106 is connected to a corresponding line of the lines represented by lines 80, 82, 84, and 86; and, the output of each of the gates is connected to a corresponding line of the lines represented by lines 80, 82, 84, and 86.

An RS-type flip flop 120 is connected to two of the lines represented by lines 80, 82, 84, and 86. Specifically, flip flop 120 is configured with the flip flop set input (S) connected to line 82, with the flip flop reset input (R) connected to line 84, and with the flip flop data output (Q) connected to a line 122.

Data register 46, which is of the same length (has the same number of stages) as state register 12 (eight), includes a clock input, a serial data input for use with the clock input for shifting test data (in serial format) into the register, and a serial data output for use with the clock input for shifting test data (in serial format) out of the register. Further, data register 46 includes a load input, a number of parallel data inputs (eight) for use with the load input for loading test data (in parallel format) into the register and a number of parallel data outputs (eight) for transmitting test data (in parallel format) out of the register.

The clock input of data register 46 is coupled to line 20 by a 2-input AND gate 130 and an inverter 132 to receive the (externally) developed diagnostic circuit 10 driving, serial diagnostic signal clocking signal only when a diagnostic circuit 10 driving, command/data control signal having a low-logic level is (externally) developed on line 24. More particularly, the clock input of data register 46 is coupled by a line 134 to the output of gate 130. One input of gate 130 is coupled by a line 136 and inverter 132 to line 24 to receive the diagnostic circuit 10 driving, command/data signal. The other input of gate 130 is connected to line 20 to receive the diagnostic circuit 10 driving, serial diagnostic signal clocking signal. Further, the serial data input of data register 46 is directly connected to line 22, to receive the (data portion of the) (externally) developed diagnostic circuit 10 driving, serial diagnostic signal. The serial data output of data register 46 is connected to a line 138. The load input of data register 46 is connected to line 86; the eight register parallel data inputs are connected each to a corresponding line of an eight line bus 140; and, the eight register parallel data outputs are connected each to a corresponding line of an eight line bus 142.

In the presently preferred embodiment, a multiplexer 150 is employed which includes a control (select) input, a first data input, a second data input, and a data output. Multiplexer 150 is of the type which develops at the data output a signal the logical state of which correspond to the state of the signal developed either at the first or at the second data input as selected by the logical state of a signal developed at the control input. Multiplexer 150 is configured with one of the multiplexer data inputs connected to line 22, with the other one of the multiplexer data inputs connected to line 64, with the multiplexer control input connected to line 122, and with the multiplexer data output connected to a line 152.

Finally, multiplexer 48, which is similar to multiplexer 150, is configured with one of the multiplexer data inputs connected to line 152, with the other one of the multiplexer data inputs connected to line 138, with the multiplexer control input connected to line 24, and with the multiplexer data output connected to line 26.

Diagnostic circuit 10 is connected in cascade with other diagnostic circuits. Line 26 of one circuit is connected to line 22 of the next circuit to transmit the (externally developed) serial diagnostic signal from one circuit to the next. Line 20 of all of the diagnostic circuits are interconnected to receive, in parallel, the (externally developed) serial diagnostic signal clocking signal; and, to receive, in parallel, the (externally developed) command/data control signal, line 24 of all of the diagnostic circuits are interconnected.

Operationally, when a command/data control signal having a low-logic level is (externally) developed on line 24, serial diagnostic signal data is shifted (serially) through the various diagnostic circuits including diagnostic circuit 10, loading all of the circuits simultaneously. More specifically, with each low-level-to-high-level transition of a serial diagnostic signal clocking signal (externally) developed on line 20, one bit of data represented by a serial diagnostic signal (externally) developed on line 22 is shifted into data register 46 and one bit of data (shifted into the register eight serial diagnostic signal clocking signal cycles earlier) is shifted out of the register onto line 26.

Next, the level of the command/data control signal developed on line 24 is changed to a high-logic level. Then, serial diagnostic signal commands are shifted (serially) through the various diagnostic circuits including diagnostic circuit 10, again loading all of the circuits simultaneously. With each low-level-to-high-level transition of the serial diagnostic signal clocking signal developed on line 20, one command bit, represented again by the serial diagnostic signal developed on line 22 is shifted into command register 40 and one command bit (shifted into the register four serial diagnostic signal clocking signal cycles earlier) is shifted out of the register onto line 26.

Finally, from the high-level-to-low-level transition of the command/data control signal (externally) developed on line 24 until the low-level-to-high-level transition of the next cycle of the serial diagnostic signal clocking signal (externally) developed on line 20, the command previously shifted into command register 40 is executed. Thereafter, serial diagnostic signal data is again shifted in/out.

For testing the circuit represented by state register 12 and the eight tri-state buffers, represented by buffer 14, diagnostic circuit 10 additionally includes five multiplexers 200, 202, 204, 206, and 208 and eight tri-state buffers, represented by a buffer 210. Multiplexers 200, 202, 204, 206, and 208 are of the type which develops at a set of eight data outputs eight signals the logical state of which correspond each to the state of a respective signal developed either at a first or at a second set of eight data inputs.

The additional multiplexers and buffers are configured, multiplexer 200 with one set of eight multiplexer data inputs connected each to a corresponding line of the eight lines of bus 140, with the other set of eight multiuplexer data inputs connected each to a corresponding line of the eight lines of bus 142, and with the set of eight multiplexer data outputs connected each to a corresponding line of an eight line bus, which is designated 220. The eight tri-state buffers, represented by buffer 210, are connected each between a corresponding line of the eight lines of bus 220 and a corresponding line of the eight lines of (D) bus 30.

Multiplexer 202 is configured with one set of multiplexer data inputs connected to bus 140, with the other set of multiplexer data inputs connected to (D) bus 30, and with the set of multiplexer data outputs connected to an eight line bus 224; and, multiplexer 204 is configured with one set of multiplexer data inputs connected to bus 140, with the other set of multiplexer data inputs connected to (D) bus 30, and with the set of multiplexer data outputs connected to an eight line bus 226.

State register 12 has eight data inputs each connected to the corresponding line of the eight lines of bus 226, a clock (load) input connected to line 32, and eight data outputs each connected to a corresponding line of an eight line bus, which is designated 230.

Multiplexer 206 is configured with one set of multiplexer data inputs connected to bus 224, with the other set of multiplexer data inputs connected to bus 230, and with the set of multiplexer data outputs connected to (Q) bus 34; and, multiplexer 208 is configured with one set of multiplexer data inputs connected to (Q) bus 34, with the other set of multiplexer data inputs connected to (Y) bus 38, and with the set of multiplexer data outputs connected to bus 142.

Finally, the eight tri-state buffers represented by buffer 14 are connected each between a corresponding line of the eight lines of (Q) bus 34 and a corresponding line of the eight line (Y) bus 38. The tri-state control input of each of the buffers represented by buffer 14 is connected to line 36.

(Absent diagnostic circuit 10, the eight data inputs of state register 12 would be directly connected each to a corresponding line of the eight lines of (D) bus 30; and, the eight data outputs of the register would be directly connected each to a corresponding line of the eight lines of (Q) bus 34.)

The gates of decoding circuit 42 are configured to control the registers, multiplexers, and gates to provide the following commands:

| CODE | COMMAND |
| --- | --- |
| zero | Y to data register |
| one | Q to data register |
| two | D to data register |
| three | Y to data register synchronous with clocking signal |
| four | status (lines 128 and 136) to data register |
| five | connect Y to D |
| six and seven | reserved (no-op) |
| eight | data register to Y |
| nine | data register to D |
| ten | data register to state register |
| eleven | select serial mode |
| twelve | select stub mode |
| thirteen | data register to Y synchronous with clocking signal |
| fourteen | connect D to Y |
| fifteen | no-op |

More specifically, The gates of decoding circuit 42 are configured to control the registers, multiplexers, and gates such that when a binary encoded code of zero is shifted into command register 40, multiplexer 208 develops at the set of eight data outputs connected to bus 142 eight signals the logical state of which correspond each to the state of a respective one of the eight signals developed on the eight lines of (Y) bus 38 and data register 46 loads the eight signals developed (in parallel format) on bus 142 into the register.

Responsive to a binary code of one, multiplexer 208 develops on (couples to) bus 142 signals correspond to the signals developed on (Q) bus 34 and data register 46 loads the signals developed on bus 142 into the register.

Multiplexer 202 develops on bus 224 signals corresponding to the signals developed on (D) bus 30, multiplexer 206 couples the signals to (Q) bus 34, multiplexer 208 couples the signals to bus 142, and data register 46 loads the signals into the register responsive to a binary code of two.

Responsive to a binary code of three, multiplexer 208 couples to bus 142 the signals developed on (Y) bus 38 and data register 46 loads the signals developed on bus 142 into the register synchronous with the clocking signal (externally) developed on line 32.

The status (state) of the signals (externally) developed one on line 36 and the other on line 32 are loaded into data register 46 responsive to a binary code of four.

Multiplexer 208 couples the signals developed on (Y) bus 38 to bus 142 and multiplexer 200 and the buffers represented by buffer 210 couple the signals to (D) bus 30 responsive to a binary code of five.

Responsive to a binary code of eight, signals developed (in parallel format) by data register 46 on bus 140 are coupled by multiplexer 202 to bus 224, by multiplexer 206 to (Q) bus 34 and by the buffers represented by buffer 14 to (Y) bus 38.

Signals developed (in parallel format) by data register 46 on bus 140 are coupled by multiplexer 200 to bus 220 and by the buffers represented by buffer 210 to (D) bus 30 Responsive to a binary code of nine.

Responsive to a binary code of ten, signals developed by data register 46 on bus 140 are coupled by multiplexer 204 to bus 226 and loaded into state register 12.

multiplexer 150 couples the signal developed on line 64 to line 152 responsive to a binary code of eleven; and, responsive to a binary code of twelve, the multiplexer couples the signal developed on line 22 to line 152. (The later mode is useful where a command is to be repeated or where other diagnostic circuits require more commands for testing.)

Responsive to a binary code of thirteen, signals developed by data register 46 on bus 140 are coupled by multiplexer 202 to bus 224, by multiplexer 206 to (Q) bus 34, and by the buffers represented by buffer 14 to (Y) bus 38 synchronous with the clocking signal (externally) developed on line 32.

Finally, responsive to a binary code of fourteen, signals (externally) developed on (D) bus 30 are coupled by multiplexer 202 to bus 224, by multiplexer 206 to (Q) bus 34, and by the buffers represented by buffers 14 to (Y) bus 38.

It is contemplated that after having read the preceeding disclosure, certain alterations and modifications of the present invention will no doubt become apparent to those skilled in the art. It is therefore intended that the following claims be interpreted to cover all such alterations and modifications as fall within the true spirit and scope of the invention.

What is claimed is:

1. A diagnostic circuit for receiving a serial diagnostic signal which includes in serial format both commands and data, a serial diagnostic signal clocking signal, and a command/data signal, the diagnostic circuit comprising in combination:

first coupling means;

a command register including a clock input coupled by said first coupling means to receive the serial diagnostic signal clocking signal, a serial data input coupled to receive the command portion of the serial diagnostic signal, a serial data output at which said command register develops a signal representing said command portion of said serial diagnostic signal delayed a predetermined number of cycles of said serial diagnostic signal clocking signal, and a predetermined number of parallel data outputs at which said command register develops a plurality of signals representing the command most recently received by said command register;

second coupling means;

a data register including a clock input coupled by said second coupling means to receive said serial diagnostic signal clocking signal, a serial data input coupled to receive the data portion of said serial diagnostic signal, a serial data output at which said data register develops a signal representing said data portion of said serial diagnostic signal delayed a predetermined number of cycles of said serial diagnostic signal clocking signal, a predetermined number of parallel data inputs for receiving a predetermined number of signals representing data in parallel format, and a predetermined number of parallel data outputs at which said data register develops a plurality of signals representing the data most recently received by said data register;

third coupling means; and a multiplexer including a first data input coupled by said third coupling means to said command register serial data output to receive the command register developed serial diagnostic signal delayed command portion, a second data input coupled to said data register serial data output to receive the data register developed serial diagnostic signal delayed data portion, a control input coupled to receive the command/data signal, and a data output at which said multiplexer develops a delayed serial diagnostic signal.

2. A diagnostic circuit as recited in claim 1 wherein said first coupling means includes gate means for coupling said serial diagnostic signal clocking signal to said command register only during the command portion of said serial diagnostic signal.

3. A diagnostic circuit as recited in claim 2 wherein said gate means has AND gate means employing a first input coupled to receive said serial diagnostic signal clocking signal, a second input coupled to receive said command/data signal, and an output coupled to said command register clock input.

4. A diagnostic circuit as recited in claim 1 wherein said second coupling means includes gate means for coupling said serial diagnostic signal clocking signal to said data register only during the data portion of said serial diagnostic signal.

5. A diagnostic circuit as recited in claim 4 wherein said gate means has inverter means and AND gate means employing a first input coupled to receive said serial diagnostic signal clocking signal, a second input coupled by said inverter means to receive said command/data signal, and an output coupled to said data register clock input.

6. A diagnostic circuit as recited in claim 1 further comprising decoding means including a plurality of inputs connected to said command register parallel data outputs to receive said command representing signals and a plurality of outputs and command strobe generating means including a plurality of inputs connected to said decoding means outputs and a plurality of outputs at which said command strobe generating means develops for a predetermined period of time signals representing a strobed command.

7. A diagnostic circuit as recited in claim 6 wherein said command strobe generating means has flip flop means employing a clock input coupled to receive said serial diagnostic signal clocking signal, a data input coupled to receive said command/data signal, and a data output, inverter means, first AND gate means employing a first input coupled by said inverter means to receive said command/data signal, a second input connected to said flip flop means data output, and an output, and a plurality of second AND gate means each employing a first input connected to said first AND gate means output, a second input connected to a corresponding one of said decoding means outputs, and an output, said second gate means developing at said second gate means outputs said strobed command signals.

8. A diagnostic circuit as recited in claim 1 wherein said third coupling means includes multiplexer means having a first data input connected to said command register serial data output, a second data input coupled to receive said serial diagnostic signal, and a data output connected to said multiplexer first data input.

* * * * *

REEXAMINATION CERTIFICATE (2078th)
United States Patent [19]
Miller

[11] B1 4,710,927

[45] Certificate Issued Aug. 31, 1993

[54] DIAGNOSTIC CIRCUIT

[75] Inventor: Michael J. Miller, San Jose, Calif.

[73] Assignee: Integrated Device Technology, Inc., Santa Clara, Calif.

Reexamination Request:
No. 90/002,639, Feb. 18, 1992

Reexamination Certificate for:
| | |
|---|---|
| Patent No.: | 4,710,927 |
| Issued: | Dec. 1, 1987 |
| Appl. No.: | 888,701 |
| Filed: | Jul. 24, 1986 |

[51] Int. Cl.$^5$ .............................................. G01R 31/28
[52] U.S. Cl. ..................................... 371/22.1; 371/22.3
[58] Field of Search ................... 324/158 R; 371/22.1, 371/22.3, 15.1

[56] References Cited

U.S. PATENT DOCUMENTS

| | | | |
|---|---|---|---|
| 3,761,695 | 9/1973 | Eichelberger | 371/22.3 |
| 3,783,254 | 1/1974 | Eichelberger | 364/700 |
| 3,806,891 | 4/1974 | Eichelberger | 395/275 |
| 4,286,173 | 8/1981 | Oka et al. | 307/440 |
| 4,293,919 | 10/1981 | DasGupta et al. | 364/716 |
| 4,298,980 | 11/1981 | Hajdu et al. | 371/22.3 |
| 4,428,060 | 1/1984 | Blum | 364/715 |
| 4,488,259 | 12/1984 | Mercy | 371/22.3 |
| 4,701,920 | 10/1987 | Resnick et al. | 371/22.5 |

FOREIGN PATENT DOCUMENTS

| | | |
|---|---|---|
| 84/1225 | 3/1984 | PCT Int'l Appl. . |
| 84/02580 | 7/1984 | PCT Int'l Appl. . |

OTHER PUBLICATIONS

"Electronic Chip-In-Place Test," by P. Goel et al., Digest of Papers, 1982 International Test Conference, Nov. 15–18, pp. 83–90.

"LSI Self-Test Using Level Sensitive Scan Design and Signature Analysis," by D. Komonytsky, Diget of Papers, 1982 International Test Conference, Nov. 15–18, 1982, pp. 414–424.

"Shifting Away from Probes for Wafer Test," by J. Zasio, Digest of Papers, Compcon, Sprin 83, 1983, pp. 395–398.

"An approach to a testing system for LSI," H. Jones et al., Computer Aided Design of Digital Electronic Circuits and Systems, (1979), pp. 187–204.

"A Logic Design Structure for LSI Testability," E. Eichelberger et al., Proceedings, 14th Design Automation Conference (1977), pp. 462–468.

"Built-In Test for Complex Digital Integrated Circuits," Bernd Könemann et al., IEEE Journal of Solid-State Circuits, vol. SC-15, No. 3, Jun. 1980, pp. 315–319.

"Testability Circuit Solves SMT Board Access Problems," Jon Turino, Electronic Packaging & Production, Jan. 1986, pp. 110–113.

"Scan-Design Methods Increase Testability of Standard Cells," Mark A. Buchanan, Computer Design, Mar. 1, 1986, pp. 79–84.

"VLSI Testing," T. W. Williams, Computer, Oct. 1984, pp. 126–136.

"Variable Access Latch Test," IBM Technical Disclosure Bulletin, vol. 28, No. 10, Mar. 1986, pp. 4475–4477.

"Generalized Scan Test Technique for VLSI Circuits," IBM Technical Dislosure Bulletin, vol. 28, No. 4, Sep. 1985, pp. 1600–1604.

"Interconnection Test Arrangement," J. D. Barnes, IBM Technical Disclosure Bulletin, vol. 22, No. 8B, Jan. 1980, pp. 3679–3680.

"Logic-Array Isolation for Testing," P. Goel, IBM Technical Disclosure Bulletin, vol. 23, No. 7A, Dec. 1980, pp. 2794–2799.

"LSSD Scan Technique," S. DasGupta, IBM Technical Disclosure Bulletin, vol. 24, No. 8, Jan. 1982, p. 4425.

"An Alternative to Scan Design Methods for Sequential Machines," Saluja et alius, IEEE Transactions on Computers, vol. C-35, No. 4, Apr. 1986, pp. 384–388.

"Checking Out VLSI With Standard Test Gear," Technology to Watch, Electronics, May 26, 1986, pp. 33–35.

"Level-Sensitive Scan Design Test Chips, Boards, System," Neil C. Berglund, Electronics, Mar. 15, 1979, pp. 108–110.

"VLSI-Chip Test System Itself At Board Level,"

Technology to Watch, Electronics, Aug. 5, 1985, pp. 46–49.

"Design for Testability—A Survey," Thomas W. Williams and Kenneth P. Parker, IEEE Transactions on Computers, vol. C-31, No. 1, Jan. 1982, pp. 2–15.

"Structured Design for Testability in Semicustom VLSI," James H. Aylor, Barry W. Johnson and Bruce J. Rector, IEEE Micro, Feb. 1986, pp. 51–58.

"The Self-Assist Test Approach to Embedded Arrays," D. Westcott, 1981 IEEE Test Conference, Paper 9.1, pp. 203–207.

"A Self-Test Method for Digital Circuits," M. T. M. Segers, 1981 IEEE Test Conference, Paper 4.1, pp. 79–85.

"Scan Path in CMOS Semicustom LSI Chips?" M. Gerner and H. Nertinger, 1984 IEEE International Test Conference, Paper 25.1, pp. 834–841.

"Electronic Chip-In-Place Test," P. Goel and M. T. McMahon, 1982 IEEE Test Conference, Paper 3.6, pp. 83–89.

"Electronic Chip-In-Place Test," P. Goel and M. T. McMahon, Proceedings 19th Design Automation Conference, 1982, Paper 30.1, pp. 482–488.

"An Enhancement of LSSD To Reduce Test Pattern Generation Effort and Increase Fault Coverage," Saluja, Proceedings 19th Design Automation Conference, 1982, Paper 30.2, pp. 489–494.

"Digital Test Generation and Design for Testability," Grason et al., Association for Computing Machinery, 1980, IEEE Catalog No. 0-89791-02-0-6/80/0600/0175, pp. 175–189.

"Selective Controllability: A Proposal for Testing and Diagnosis," F. Hsu, P. Solecky and L. Zobniw, Proceedings of 1978 Semioconductor Test Conference, pp. 110–116.

"Automatic Checking of Logic Design Structures for Compliance with Testability Ground Rules," Godoy et al., Proceedings 14th Design Automation Conference, 1977, pp. 469–478.

"A Variation of LSSD and Its Implications on Design and Test Pattern Generation in VLSI," DasGupta et al., 1982 IEEE Test Conference, Paper 3.3, pp. 63–66.

"Structured Trace Diagnosis for LSSD Board Testing—An Alternative to Full Fault Simulated Diagnosis," Hsu et al., Proceedings, 18th Design Automation Conf., 1981, Paper 44.3, pp. 891–897.

J. Becker, et al., "Element Test and Maintenance Bus (ETM-Bus)," *VHSIC Phase 2 Interoperability Standards,* Version 1.0, IBM, Honeywell TRW, (1985), pp. 1–19.

Alexander Alicki et al, "Distribution of Control Signals in Self-Testing Designs," Technical Report EL-86-02, University of Rochester, College of Engineering and Applied Sciences, Department of Electrical Engineering, Rochester, N.Y., Feb. 1986 (Albicki) pp. 1–22 and Appendix, pp. A-1 thru A4.

*Primary Examiner*—Charles E. Atkinson

[57] ABSTRACT

A diagnostic circuit is disclosed which employs a command register for receiving in serial format the command portion of a serial diagnostic signal and for developing in parallel format signals representing the command most recently received, a data register for receiving in serial format the data portion of the serial diagnostic signal, for receiving in parallel format signals representing data, for developing in parallel format signals representing the data most recently received and a multiplexer for combining the command portion and the data portion of the serial diagnostic signal after they have passed through the command and data registers.

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–8 is confirmed.

* * * * *